United States Patent [19]

Skor et al.

[11] 4,126,296
[45] Nov. 21, 1978

[54] ECCENTRIC FAUCET INSERT

[76] Inventors: Dimitry V. Skor, 204 Dewey Ave., Morgantown, W. Va. 26505; John L. Fogle, 5 Allegany St., Lonaconing, Md. 21539

[21] Appl. No.: 762,580

[22] Filed: Jan. 26, 1977

[51] Int. Cl.² .............................................. F16K 5/14
[52] U.S. Cl. ................................... 251/363; 251/360; 251/286; 251/185; 251/304; 251/317; 137/606
[58] Field of Search ............... 251/360, 363, 364, 304, 251/316, 317, 286, 180, 185; 137/606

[56] References Cited

U.S. PATENT DOCUMENTS

| | | | |
|---|---|---|---|
| 1,014,766 | 1/1912 | Lytton | 251/286 |
| 1,085,688 | 2/1914 | Kaufman | 251/316 |
| 1,694,694 | 12/1928 | Walker | 251/286 |
| 2,115,247 | 4/1938 | Bellinger | 251/286 |
| 2,455,087 | 11/1948 | Parker | 251/185 |
| 3,009,679 | 11/1961 | Williams | 251/363 |
| 3,144,048 | 8/1964 | Acker et al. | 251/317 |
| 3,292,898 | 12/1966 | Willman | 251/317 |

Primary Examiner—William R. Cline
Assistant Examiner—H. Jay Spiegel

[57] ABSTRACT

A water valve for lavatory, garden and other use having a housing forming a chamber with a fluid inlet in the bottom wall and a fluid outlet port in the side wall has a replaceable seat means on the bottom wall. The valve has a valve means mounted for rotation about the longitudinal axis of the valve, and a cover journalling said valve means is screwed into the top of the valve body. The replaceable seat means is a multi-purpose element, having a planar surface for engagement by the valve means a cylindrical liner for the inlet port, and stop means to limit the travel of the valve means.

1 Claim, 3 Drawing Figures

ECCENTRIC FAUCET INSERT

BACKGROUND AND DESCRIPTION OF THE PRIOR ART

Valves of the type used in house plumbing, that is for kitchen and lavatory sinks, garden use and general household plumbing conventionally employ vertically moveable valve closure elements having a washer which is sealed against a seat such as is shown for example in U.S. Pat. Nos. 2,510,429 and 3,448,768. These valves have a number of deficiencies and have led to the development of valves with rotary closure members, such as is shown in U.S. Pat. No. 3,645,493. In that patent, rotatable closure element is located in a body having inlet and outlet ports. In this valve, the flow is controlled by a rotary valving member having a passage there through selectively connecting the inlet and outlet ports in the valve body. Thus, it can be seen that the inlet port and the valving member passage are both subject to the eroding effects of the fluid flow.

In the valve of the instant invention, a closure means is located on an eccentrically-positioned portion of the valving member so that when the valve is in the open position the closure means is substantially removed from the eroding effect of the fluid flow, and a replaceable liner portion is provided in the inlet port to accommodate any effect that scouring action of the flow might inflict. Additionally, a liner portion covering the bottom wall of the valve body is formed with the inlet liner portion. The bottom wall liner is replaceable with the inlet liner and has minimal frictional characteristics for easy operation and maintenance. Mounted on this assembly of the inlet liner and the bottom wall liner is abutment means for limiting the rotation of the valve means.

SUMMARY AND OBJECTS OF THE INVENTION

It is an object of this invention to provide a valve of simple construction with replaceable parts to provide lengthened valve life. Another object is to provide a valve having improved operating ease. Another object is to provide a valve in which the operating portions are protected from detrimental action of fluid flow by replaceable liner means. A further object is to provide a multi-purpose insert which is easily replaced without the need for special skills or tools. Other objects of the invention will appear as the following description proceeds.

DESCRIPTION OF THE PREFERRED EMBODIMENT

Figure 1:
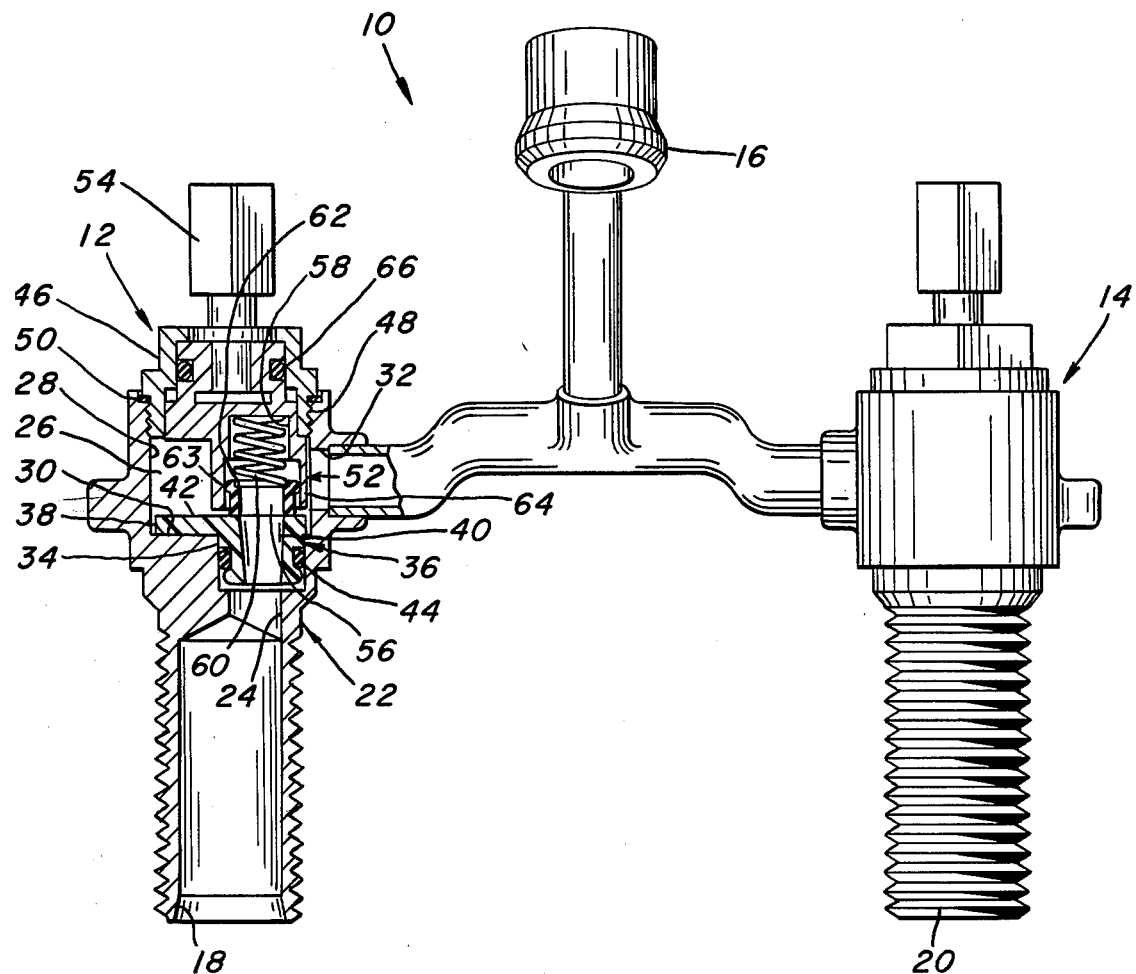
FIG. 1 is an elevation view of a dual-valved, single-spout faucet assembly, with the left-hand valve in cross-section to show the present invention.

Referring to FIG. 1 10 designates the faucet assembly often mounted on a sink or lavatory and is used here to illustrate one use of the valve 12 of the invention. In this embodiment, valves 12 and 14 are identical, with one controlling the flow of hot water and the other the flow of cold water. They are connected to a spout 16 which discharges the mixture into a suitable receptacle (not shown). The valves 12 and 14 are connected to water supplies (not shown) at 18 and 20 respectively.

Inasmuch as valves 12 and 14 are identical, only valve 12 is shown in section on FIG. 1 and will now be described. Valve 12 has a body shell 22 with inlet 18 opening through inlet port 24 to a chamber 26. Chamber 26 has a cylindrical side wall 28 and a planar bottom wall 30. Side wall 28 has an outlet port 32 which can be connected to a spout or other suitable discharge means. Inlet port 24 is eccentric to the longitudinal axis of valve 12 and is enlarged at its inner end 34 to accommodate a liner 36. Liner 36, better seen in FIGS. 2 and 3, has a planar portion 38, from which depends sleeve-like inlet liner portion 40. The lower surface of planar portion 38 engages chamber bottom wall 30 and the upper surface 42 provides a bearing surface for the valve closure member to rotate upon. Inlet liner portion 40 protects valve body 22 from scour and cavitation effects when fluid is flowing through the valve. To avoid flow around liner 40 an O-ring seal is provided between port 34 and liner 40.

Body 22 of valve 12 has, as mentioned above, a cylindrical side wall 28 and bottom wall 30, and is open on top. A removable cap member 46 is fixed on the top portion, as by threads 48 and a seal member 50 makes the juncture fluid-tight. This cap 46 retains a valving assembly 52 in place for rotation in the chamber 26, by means of interengaging surfaces normal to the longitudinal axis of the valve. The valving assembly 52 includes an operating stem 54 projecting through the cap 46, on which may be mounted an operating handle of suitable design (not shown).

In the closed position of the valve, the valving assembly 52 is in the position shown in FIG. 1. Valving assembly 52 has a closure means 56 mounted in a blind bore 58 for rotation over the inlet port 24 to control the flow of fluid through the valve. The closure means 56 is biased into engagement with the planar portion 38 of liner 36 by a spring 60, and additionally when the valve is in the closed position as shown in FIG. 1, the inlet pressure of the fluid is transmitted to the upper end of annular closure 56 to assist in keeping the valve tightly shut off. The spring 60 bears against the upper end of blind bore 58 and on a shoulder 62 of closure 56. An annular bead 63 is formed around the upper exterior surface of closure 56 which is of such a dimension to insure a slightly compressive engagement between the bead and the wall of bore 58. Valving assembly 52 has a depending circular portion 64 eccentric to the longitudinal valve axis and the blind bore 58 is centered in this portion. The balance of valving assembly 52 is mounted coaxially of the longitudinal axis of valve 12, and carries seal member to seal the juncture with cap member 46.

Figure 2:
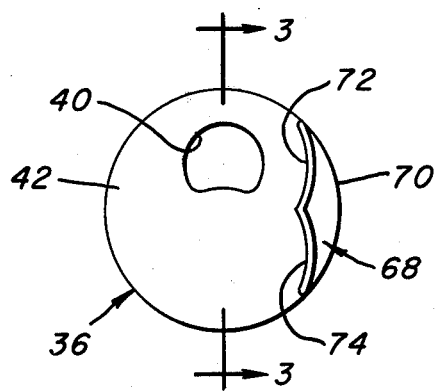
FIG. 2 is the replaceable faucet insert of FIG. 1.
Figure 3:
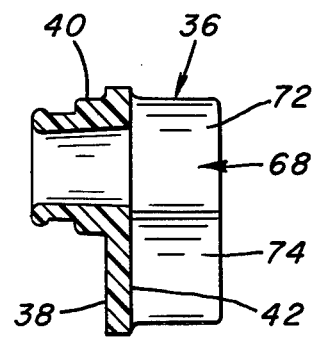
FIG. 3 is a section along the line 3—3 of FIG. 2.

Another important feature of liner 36 is best seen in FIGS. 2 and 3. This is the provision of integral stop means 68 protruding from the upper planar surface 42 of liner 36. This abutment or stop member is positioned on the planar portion 38 oriented with respect to inlet liner 40 so that it limits the rotation of valving assembly 52 to fully open and fully closed positions over inlet port 24. The stop or abutment 68 has an outside surface 70 configured to slidably fit inside valve chamber 26, and the abutment surfaces 72 and 74 are designed to receive the outer wall of circular portion 52 in surface engagement in the fully closed and fully open positions, respectively. The height of abutment 68 is not critical, except that the main body of valving assembly 52 must clear the top of the abutment in normal operation, the stop contacting only circular portion 52 side wall.

The above description envisions a valve that is easy to operate, due to the use of low-friction materials, and one that is simple to maintain, due to the straightforward construction and ease of assembly and disassembly. It can be used as illustrated, or as a single valve on hose bibs or the like.

We claim:

1. A valve comprising, a housing enclosing a chamber defined by a bottom wall, a generally cylindrical sidewall, and cover means removably closing the top of said chamber, an outlet in said sidewall, an inlet in said bottom wall, valve means rotatably mounted in said chamber for selectively permitting or blocking the flow of fluid from said inlet to said outlet, closure means mounted on said valve means for movement relative thereto in a direction toward and away from a replaceable seat insert and biased into sealing engagement therewith, a removable, self-contained one piece unitarily molded insert comprising, in combination, a bottom wall liner providing a planar bearing surface for said closure means, an integral cylindrical portion projecting downwardly from said bottom wall liner substantially into said inlet port to provide a lining in said inlet port, said cylindrical portion having inlet passage means for fluid and seal means between said inlet port and said cylindrical portion, said insert further having integral stop means with arcuate surfaces conforming to the shape of said valve means projecting from said bearing surface for limiting the rotation of said valve means between valve open and valve closed positions.

* * * * *